A. TROWBRIDGE.
SPEED INDICATOR.
APPLICATION FILED APR. 3, 1909.
983,096.
Patented Jan. 31, 1911.
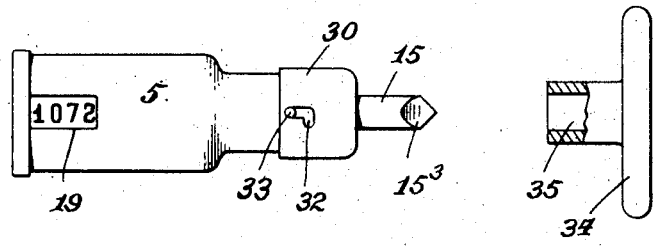
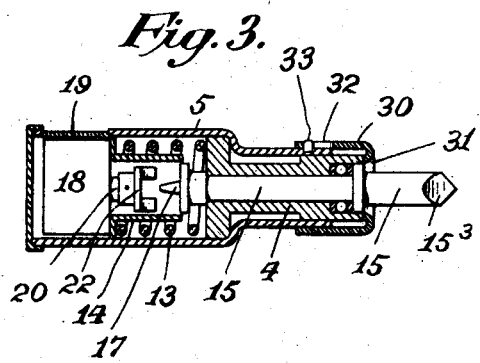
Attest:
Inventor:
Amasa Trowbridge
by Redding, Greeley & Austin
Attys.

UNITED STATES PATENT OFFICE.

AMASA TROWBRIDGE, OF HARTFORD, CONNECTICUT, ASSIGNOR TO VEEDER MANUFACTURING COMPANY, OF HARTFORD, CONNECTICUT, A CORPORATION OF CONNECTICUT.

SPEED-INDICATOR.

983,096. Specification of Letters Patent. Patented Jan. 31, 1911.

Application filed April 3, 1909. Serial No. 487,721.

*To all whom it may concern:*

Be it known that I, AMASA TROWBRIDGE, a citizen of the United States, residing in the city of Hartford, in the State of Connecticut, have invented certain new and useful Improvements in Speed-Indicators, of which the following is a specification, reference being had to the accompanying drawing, forming a part hereof.

This invention relates to speed indicators of the character of that shown in Letters Patent of the United States granted to Charles W. Sponsel, No. 870,203, dated November 5, 1907, and has for its object to so improve such speed indicators as to increase convenience in the use thereof and as to adapt them for a wider range of use. The speed indicator shown and described in said Letters Patent is provided with a longitudinally movable spindle for engaging the device the speed of which is to be ascertained and clutch elements for engaging such spindle with the indicating device. In the use of such a speed indicator the end of the spindle is pressed axially against the end of the rotating body so as to engage the spindle therewith and to cause engagement of the clutch elements, and the pressure is maintained throughout the period of time during which the speed is taken.

In accordance with the present invention latch devices are combined with the casing and with the spindle so as to maintain the engagement of the clutch elements. It therefore becomes unnecessary to exert more pressure than is necessary to hold the spindle in engagement with the device the speed of which is to be ascertained and also permits the device to be used in ascertaining linear or circumferential speed, as of a belt or wheel, in which use the engagement of the spindle with the belt or wheel is not maintained by longitudinal pressure of the spindle against the moving body, but by lateral pressure.

The invention will be more fully explained hereinafter with reference to the accompanying drawing in which one convenient and practical embodiment thereof is illustrated and in which—

Figure 1 is a view in side elevation of the improved indicator. Fig. 2 is a view partly in side elevation and partly in section of a device which will be employed in connection with the indicator shown in Fig. 1 to ascertain linear or circumferential speed. Fig. 3 is a view in central longitudinal section, partly in elevation, of the instrument shown in Fig. 1.

Except so far as the present improvement is concerned, the indicator may be constructed in any suitable manner, as for example, as shown and described in said Letters Patent, and a brief and general description thereof will therefore suffice, the same reference characters being employed herein as in said Letters Patent to designate like parts.

A casing 5, of suitable form, receives a register or counting or indicating device 18, which may be read through the sight opening 19 in the casing 5. In the other end or reduced portion of the casing is mounted a longitudinally movable sleeve bearing 4 which is pressed normally outward by a spring 13, the inward movement of the sleeve bearing 4 being limited by a flanged tube 14 which bears against the casing of the register mechanism 18. In the sleeve bearing 4 is mounted, so as to be rotatable therein and to be longitudinally movable therewith, a spindle 15 which at its outer end, as at $15^3$, may be adapted to engage the shaft or other rotating body the speed of which is to be ascertained, while at its inner end it is provided with a clutch member or element 17 which, when the spindle is thrust inwardly, is adapted to engage the corresponding clutch member or element 22 on the driving shaft 20 of the register 18. The construction and mode of use of the device, as thus far described, are the same as fully set forth in said Letters Patent, the head $15^3$ of the spindle 15 being pressed axially against the shaft or other rotating body, the clutch elements of the spindle and register being thereby engaged. The pressure is continued for the period during which the speed of the shaft or other rotating body is measured.

In the use of the indicator as already described, it is found that it is sometimes undesirable to oblige the user to continue such pressure as is necessary to hold the clutch elements in engagement, even when the device is used to count the number of rotations of a shaft or other rotating body in a given period of time, and that the device, so constructed, cannot be used to measure linear or circumferential speed, as of a belt or wheel. Accordingly there is added to the device, in accordance with the present invention, a latch device which serves to hold the sleeve 4 in its inner position, with the clutch elements of the sleeve and register in engagement. Obviously, such a latch device might be applied in different ways, but as shown in the embodiment of the invention which is presented in the drawing, it comprises a sleeve 30 fitting loosely upon the reduced end of the casing 5 and having its forward end flanged or inturned, as at 31, to contact with the end of the sleeve bearing 4. In the body of the sleeve 30 is formed a bayonet slot 32 which embraces a pin or stud 33 fixed in the casing 5. The longitudinal portion of the slot 32 is of such length as to permit the sleeve 30 to move outward far enough to permit disengagement of the clutch elements 17 and 22, and the transverse portion of the slot is so placed that when the spindle 15 is pushed inwardly, to effect engagement of the clutch elements, the sleeve 30 may then receive a partial rotation so that the pin or stud 33 shall be engaged in the transverse portion of the slot 32 and, through the contact of the sleeve 30 with the sleeve 4, maintain the engagement of the clutch elements. It thus becomes unnecessary to continue to exert pressure for the purpose of maintaining the clutch elements in engagement during the use of the device. Furthermore, to enable the device to be used for indicating linear or circumferential speed, a disk or wheel 34, having a circumference of definite length, as, for example, half a foot, is applied to the spindle 15, as by means of a sleeve 35 which will fit closely upon the spindle. The rim of the disk or wheel 34 may then be held, for a definite period of time, as, for example, a half minute, against the belt or the rim of the wheel, the linear or circumferential speed of which is to be ascertained, and the register will then indicate the number of units of length which pass in contact with the disk or wheel 34 during the given period of time, that is, will indicate the linear or circumferential speed. Obviously there can be no such longitudinal pressure upon the spindle 15 in such use of the device, as is necessary to maintain engagement of the clutch elements, but the latch device 30 serves this purpose and therefore enables the device to be used in the manner indicated.

I claim as my invention:

1. A speed indicator comprising a casing, an indicating device, a bearing longitudinally movable within the casing, a spindle carried by the bearing for engaging the moving body the speed of which is to be ascertained, clutch elements for engaging the spindle with the counting and indicating device, and a sleeve carried by the casing and having a pin and slot connection therewith and adapted to contact with the end of the bearing, whereby the clutch elements may be held in engagement.

2. A speed indicator comprising a casing, an indicating device, a bearing longitudinally movable within the casing, a spindle carried by the bearing for engaging the moving body the speed of which is to be ascertained, clutch elements for engaging the spindle with the counting and indicating device, a spring acting upon the bearing to hold the clutch elements normally out of engagement and a sleeve carried by the casing and having a pin and slot connection therewith adapted to contact with the end of the bearing, whereby the clutch elements may be held in engagement.

3. A speed indicator comprising a casing, a counting and indicating device, a bearing longitudinally movable within the casing, a spindle carried by the bearing, a disk or wheel carried by the spindle and adapted for circumferential engagement with the body the speed of which is to be ascertained, clutch elements for engaging the spindle with the counting and indicating device, a spring acting upon the bearing to hold the clutch elements normally out of engagement and a sleeve carried by the casing and having a pin and slot engagement therewith and adapted to contact with the bearing to hold the clutch elements in engagement against the action of the spring.

This specification signed and witnessed this 31st day of March, A. D. 1909.

AMASA TROWBRIDGE.

Signed in the presence of—
CHARLES G. ALLYN,
E. BARRIE SMITH.